United States Patent [19]

Sagawa

[11] Patent Number: 5,050,637
[45] Date of Patent: Sep. 24, 1991

[54] RELIEF VALVE
[75] Inventor: Toyoaki Sagawa, Kobe, Japan
[73] Assignee: Kawasaki Jukogyo Kabushiki Kaisha, Hyogo, Japan
[21] Appl. No.: 527,733
[22] Filed: May 23, 1990
[51] Int. Cl.⁵ .................................. F16K 17/04
[52] U.S. Cl. .................................. 137/529; 137/514
[58] Field of Search .................................. 137/514, 529
[56] References Cited
U.S. PATENT DOCUMENTS
2,727,529 12/1955 Kodet .................................. 137/529 X Primary Examiner—Gerald A. Michalsky
Attorney, Agent, or Firm—Wenderoth, Lind & Ponack

[57] ABSTRACT

The present invention relates to relief valves, and is drawn to a relief valve that alleviates the rise in the relief pressure, by the compression of a main spring via a moving spring receiving member, due to the introduction of hydraulic pressure at the supply side into a fluid chamber at the rear of a movable spring member. Moreover, an adjustment spring to urge the moving body and to assist the main spring is provided within a fluid chamber, and the urging force of this adjustment spring can be adjusted by the operation of a changing member provided externally of the valve. Thus, the set pressure of the relief valve can be easily and readily changed, and also a fine adjustment of the set pressure can be effected.

4 Claims, 2 Drawing Sheets

RELIEF VALVE

FIELD OF THE INVENTION

The present invention relates to a relief valve used in pressure adjustment and the like in hydraulic circuits.

DESCRIPTION OF THE PRIOR ART

Japanese Patent Application Laid-Open Publication Number 100675-57 discloses a relief valve that is used in the swivel brake of construction equipment such as power shovels and the like. As shown in FIG. 4, this relief valve comprises a moving body 63 that is movable over a predetermined distance in the axial direction of the relief valve 61 so as to open and close a passage 62 communicating between a side for the supply of and a side for the relief of a hydraulic fluid, and a moving spring receiving member 64 that is movable over a predetermined distance in the axial direction of the relief valve 61. Spring receiving member 64 is disposed between an outer periphery of the moving body 63 and an inner periphery of the main body of the relief valve 61. Furthermore, also provided between the moving body 63 and one end of the moving spring receiving member 64, is a main spring 65 that urges the internally fitted moving body 63 toward one end of the relief valve, and the moving spring receiving member 64 toward the other end. This prior art valve also has a hole 67 formed in the moving body 63 so that one portion of the hydraulic fluid in the supply side and acting on one end surface of the moving body 63 is introduced into the fluid chamber 66 defined at the other end of the moving spring receiving member 64 to alleviate the rise in the relief pressure by compressing the main spring 65 so as to move the spring receiving member 64. The hole 67 in the moving body 63 and the fluid chamber 66 communicate via a hole 69 extending radially through the moving body 63, a ring groove 70 formed in the moving spring receiving member 64, and a hole 71 extending radially through the moving spring receiving member 64. The movement of the moving spring receiving member 64 restricts the flow passage of the hydraulic fluid that flows into the ring groove 70 from the hole 69 so that the rise in the relief pressure is alleviated even further, and so that it is possible to reduce the shock caused by sharp rises in the relief pressure. This is to say that the configuration of the prior art reduces the impact applied to the parts actuated by the hydraulic circuits. Moreover, reference numeral 73 designates a supply passage for the hydraulic fluid and 74 a relief passage for the hydraulic fluid. In addition, Japanese Patent Application Laid-Open Publication Number 21814-1988 discloses a relief valve of this type.

However, in such a conventional relief valve, when the ultimate relief pressure, that is to say, the set pressure for the relief valve, is to be changed, it is not possible to change the same from the exterior of the main body of the relief valve 61, and this necessitates inserting a filler between the moving spring receiving member 64 and the main spring 65. Because of this, the adjustment operation to change the setting requires much time and labor and there is the additional problem of it being difficult to effect a fine adjustment.

SUMMARY OF THE INVENTION

In order to eliminate the problems encountered in the prior art, the relief valve according to the present invention comprises a moving body that opens and closes a communicating path between a supply side and a relief side for hydraulic fluid, and which is disposed so as to be movable over a predetermined distance in the axial direction of the relief valve in which it is fitted, and a movable spring receiving member that is movable over a predetermined distance in the axial direction of the relief valve, and which is disposed between an outer periphery of the moving body and an inner periphery of the main body of the relief valve. Furthermore, also provided between one end portion of the moving spring receiving member and one end of the moving body, is a main spring that urges the internally fitted moving body in the axial direction towards one end, and the moving spring receiving member in the axial direction towards the other end. A hole is formed in the moving body so that one portion of the hydraulic fluid in the supply side and acting on one end surface of the moving body is introduced into the fluid chamber defined at the other end of the moving spring receiving member. The set pressure is that necessary to compress the main spring and is generated by the hydraulic pressure in the fluid chamber acting via the moving spring receiving member. This set pressure can be adjusted by an adjustment spring provided in the fluid chamber to urge the moving body in the axial direction, with the urging force of this adjustment spring being adjustable by an adjustment means provided so as to be operable from the exterior of the main body of the relief valve.

Inside the fluid chamber is provided an adjustment spring to urge the moving body in the axial direction and a changing means to change the urging force of this adjustment spring. This changing means is operable from the exterior of the main body of the relief valve. The set pressure which is the ultimate pressure of the relief valve is therefore determined by the sum of the urging force of the main spring and the urging force of the adjustment spring. Furthermore, the urging force of the adjustment spring can be changed from the outside and so it is possible to adjust the set pressure of the relief valve by a simple manipulation of the changing means. Accordingly, the troublesome work associated with changing the set pressure of a conventional relief valve by disassembling the valve and inserting fillers is not necessary, and fine adjustment becomes possible.

BRIEF DESCRIPTION OF THE DRAWINGS

These and other objects and advantages of the present invention will be better understood with reference to the following description and the accompanying drawings in which.

DETAILED DESCRIPTION OF THE PREFERRED EMBODIMENTS

Now, embodiments of this invention will be described below with reference to the accompanying drawings.

Figure 1:
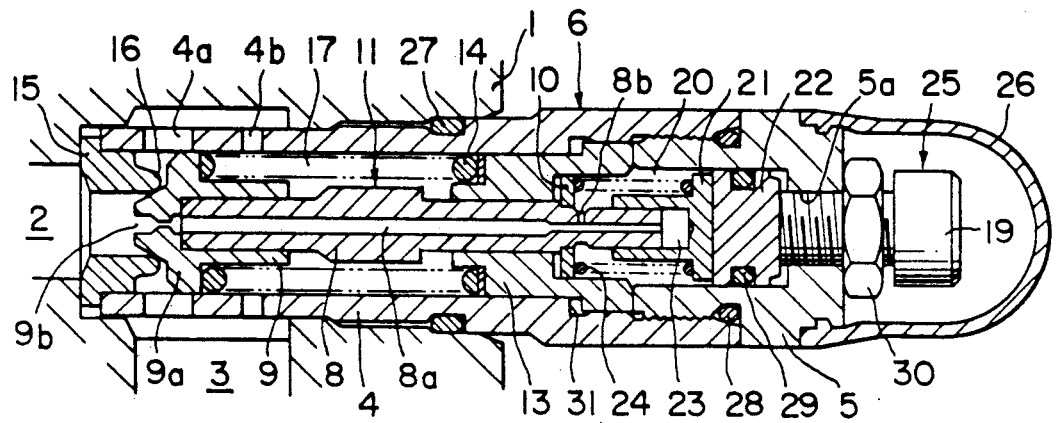
FIG. 1 is a sectional view of a first embodiment of a relief valve according to the present invention.

As shown in FIG. 1, which is a sectional view of a relief valve of a first embodiment according to the present invention, a valve casing 1 has formed in it a supply passage 2 and a relief passage 3. Into a hole in the valve casing 1 is inserted off-center (to the left of center in the figure) a sleeve 4 having a substantially cylindrical shape, and the inner periphery of the other end of this sleeve 4 engages the outer periphery of a plug 5 having a substantially cylindrical shape and at a position closer to one of its ends. One end of the sleeve 4 has holes 4a and 4b extending therethrough at approximately equal distances and these holes 4a and 4b communicate between the sleeve 4 and the relief passage 3. In addition, the inner periphery of the other end of plug 5 forms a thread 5a. The valve main body 6 is constituted by the valve casing 1, the sleeve 4 and the plug 5.

Along the axis of the sleeve 4 is disposed a rod 8 having a substantially cylindrical shape, and along the full length of this rod 8 is formed a through hole 8a. At the other end of the rod 8 is formed a small hole 8b extending radially from the through hole 8a to the outer periphery of the rod 8. The outer periphery at one end of this rod 8 engages the inner periphery of a plunger 9 which has the shape of a cylinder with one end closed, and the other periphery of a ring-shaped protruding portion 9a provided monolithically to the outer periphery of one end of the plunger 9 engages an inner periphery of one end of the sleeve 4 so as to be freely movable. Along the entire length of this plunger 9 is formed a hole 9b and the diameter of this hole 9b becomes smaller at a portion in the vicinity of the bottom of the plunger 9 (i.e. at one end portion). The outer periphery of the other end of the rod 8 is in fixed engagement with the inner periphery of a ring body 10. A moving body 11 is constituted by the rod 8, the plunger 9 and the ring body 10.

Figure 2:
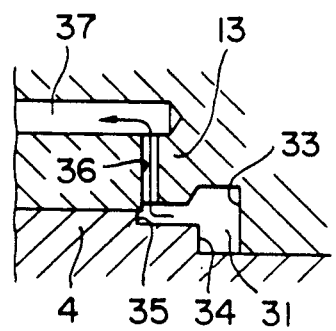
FIG. 2 is a partial, enlarged sectional view of a portion of the relief valve in the vicinity of the damping chamber, FIG. 2(A) illustrating a state immediately after the moving spring member 13 has begun to move, and FIG. 2(B) illustrating a state in which member 13 has moved to a certain extent.
Figure 2:
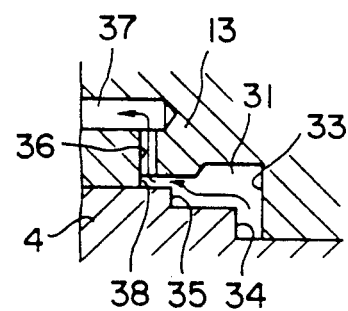

As shown in FIG. 1 and FIG. 2, towards one end of the ring body 10, the outer periphery of the other end of the rod 8 is in freely movable engagement with the inner periphery of a moving spring receiving member 13 which has a substantially rod-like shape. A main spring 14 that is a coil spring is compressed between one end of this moving spring receiving member 13 and the ring-shaped protruding portion 9a of the plunger 9.

The main spring 14 presses the plunger 9 against a sheet 15 that has a substantially tubular shape and which is fixed to the inner periphery of one end of the sleeve 4, so as to close the communicating passage 16 that communicates between the supply passage 2 and the relief passage 3, and also presses the moving spring receiving member 13 against the plug 5. This is to say, between the inner periphery of the sleeve 4 and the outer periphery of the rod 8 is formed a cylindrically-shaped spring chamber 17 that houses the main spring 14, and this spring chamber 17 is linked with the relief passage 3 via the hole 4b in the sleeve 4.

The thread 5a of the plug 5 is in engagement with an adjustment bolt 19 and this adjustment bolt 19, the plug 5, the moving spring receiving member 13 and the rod 8 define a fluid chamber 20 having a substantially cylindrical shape.

At one end of this fluid chamber 20 is provided a cylindrically-shaped bush 21 having a bottom and which is in fixed engagement with the outer periphery of the other end portion of the rod 8, and a retainer 22 which has one end in contact with the bush 21 and the other end in contact with the distal end surface of the adjustment bolt 19. The outer periphery of the bush 21 and the outer periphery of the other end of the retainer 22 are freely movable relative to the inner periphery of one end of the plug 5. The other end of the rod 8 is covered by the bush 21 to form a closed space 23 in the shape of a circular disk between the rod 8 and the bush 21, and the closed space 23 communicates with the through hole 8a in the rod 8. Between the other end portion of the bush 21 and the ring body 10 is mounted an adjustment spring 24 comprising a coil spring. This adjustment spring 24 acts via the ring body 10 and the rod 8 to press the plunger 9 against the sheet 15, and to press the retainer 22 against the adjustment bolt 19 via the bush 21. Accordingly, the rotation of the adjustment bolt 19 enables the adjustment of the force by which the plunger 9 is pressed against the sheet 15 by the adjustment spring 24. The adjustment bolt 19, the bush 21 and the retainer 22 constitute a changing means 25 that can change the urging force of the adjustment spring 24. In addition, the outer periphery of the other end of the plug 5 has fitted to it a cap 26 that covers a head portion of the adjustment bolt 19. The material of this cap 26 is synthetic resin or the like, and the shape is approximately that of a hemisphere. The inner periphery of the open end of this cap 26 is in engagement with the outer periphery of the other end of the plug 5.

Between the outer periphery of the central portion of the sleeve 4 and the valve casing 1 is fitted a ring-shaped packing 27, between the inner periphery of the other end of the sleeve 4 and the outer periphery of the central portion of the plug 5 is fitted a ring-shaped packing 28, and between the outer periphery of the retainer 22 and the inner periphery of the plug 5 is fitted a ring-shaped packing 29. In addition, the adjustment bolt 19 engages a lock nut 30 that is in contact with the surface of the other end of the plug 5.

A stepped portion is formed along the inner periphery of the sleeve 4 and along the outer periphery of the moving spring receiving member 13 that move against each other, thereby forming a ring-shaped damping chamber 31.

This is to say that, as shown in detail in FIG. 2(A), the outer periphery of the moving spring receiving member 13 has formed in it a stepped portion 33, and the inner periphery of the sleeve 4 has formed in it two stepped portions 34 and 35. These stepped portions 33, 34, 35 form the ring-shaped damping chamber 31. This ring-shaped damping chamber 31 communicates with the spring chamber 17 via a hole 36 formed in the moving spring receiving member 13 in the direction of its radius, and the hole 37 formed in the moving spring receiving member 13 in the direction of its axis. When the moving spring receiving member 13 moves to one end because of fluid pressure of fluid chamber 20, as shown in FIG. 2(B), a restricted passage 38 is formed between the ring-shaped damping chamber 31 and the hole 36.

The following is a description of the operation of the relief valve according to the present invention. When the hydraulic pressure generated in the supply passage 2 and acting on one end of the plunger 9 exceeds a certain predetermined pressure, the moving body 11 overcomes the urging force of the main spring 14 and moves towards the other end, and a gap is formed between the plunger 9 and the seat 15 so that the valve communicating passage 16 is opened. By this, the hydraulic fluid in the supply passage 2 flows to the relief passage 3 via the communicating passage 16 and the hole 4a in the sleeve 4. On the other hand, one portion of the hydraulic fluid in the supply passage 2 flows into the fluid chamber 20 via the hole 9b of the plunger 9 and the through hole 8a of the rod 8. By this action, the moving spring receiving member 13 is pressed and moves to one end and the main spring 14 is compressed so that the urging force of the main spring 14 increases and the relief pressure rises. Then, at the point where the moving spring receiving member 13 has moved to the limit position at one end, the relief pressure becomes maximum (i.e. the set pressure) and the fluid pressure generated in the supply passage 2 is maintained. When this occurs, i.e. immediately after the moving spring receiving member 13 has begun to move, the hydraulic fluid in the ring-shaped damping chamber 31 flows into the spring chamber 17 via the hole 37 and the hole 36 in the direction of the axis, as shown in FIG. 2(A). When the movement of the moving spring receiving member 13 has progressed to a certain degree, the restricted passage 38 is formed between the ring-shaped damping chamber 31 and the hole 36, as indicated in FIG. 2(B), and the amount of hydraulic fluid that flows from the ring-shaped damping chamber 31 to the spring chamber 17 is reduced. Accordingly, the speed of movement of the moving spring receiving member 13 is reduced and the relief pressure rises more slowly. Because of this, it is possible to favorably alleviate impact caused by sudden rises in the relief pressure, and to reduce the impact that is applied to hydraulic parts.

The set pressure which is the ultimate relief pressure is determined by the sum of the urging force of the adjustment spring 24 and the urging force of the main spring 14 when in the state in which the moving spring receiving member 13 has reached the limit of its movement. Accordingly, by the operation of the adjustment bolt 19, it is possible to change the urging force of the adjustment spring 24 and to adjust the set pressure. This is to say that the cap 26 is first removed and the lock nut 30 loosened, and then the adjustment bolt 19 is rotated in a predetermined direction so that the adjustment bolt 19 moves in the direction of the distal end. By this action, the retainer 22 and the bush 21 move in a direction that compresses the adjustment spring 24 so that its urging force is increased to increase the set pressure. When the adjustment bolt 19 is rotated in the direction opposite to the predetermined direction of rotation, the effects described above is reversed, whereby the set pressure is reduced.

In this manner, the provision of the adjustment spring 24 and using the adjustment bolt 19 to adjust the urging force of this adjustment spring 24 eliminates the necessity to disassemble the relief valve as has been conventionally performed, and enables the set pressure to be adjusted by the extremely simple operation of rotating the adjustment bolt 19 from the outside of the valve main body 6, and therefore enables the adjustment operation to be promptly and easily performed. In addition, in the conventional method, when the urging force of the main spring 65 was directly changed by the insertion of a filler, the set pressure changed greatly in accordance with how many fillers were used and so it was not possible to effect a fine adjustment. However, in this embodiment, the support position of the other end of the adjustment spring 24 can be changed by the adjustment bolt 19 and so the urging force of the adjustment spring 24 can be continuously changed, and a fine adjustment is also possible. Furthermore, as in the case of the present embodiment, the formation of the outer peripheral surface of the moving spring receiving member 13 and the inner peripheral surface of the sleeve 4 as stepped portions 33, 34 and 35 so that a ring-shaped damping chamber 31 is formed, reduces the number of parts for which precision processing is required, and therefore simplifies the processing. This is to say that in the conventional valve, it was necessary to control the dimensional accuracy, in the direction of the axis, of three members—the relief valve 61, the moving body 63 and the moving spring receiving member 64—in order to accurately control the speed of movement of the moving spring receiving member 64 by accurately changing the amount of flow through the restricted passage defined by the hole 69. However, in the present embodiment, it is possible to accurately change the amount of flow through the restricted passage 38 by accurately regulating the dimensional accuracy in the direction of the axis of two parts, i.e. the moving spring receiving member 13 and the valve main body 6. In addition, as in the present embodiment, the formation of a closed space 23 between the other end portion of the rod 8 and the bush 21 is extremely favorable in preventing hunting when the relief valve is operating. This is to say that in present embodiment, although the adjustment spring 24 is disposed in the fluid chamber 20, the volume of the fluid chamber 20 is extremely great, so that if the through hole 8a of the rod 8 opens directly into the fluid chamber 20, the compression of the hydraulic fluid inside the fluid chamber 20 lowers the damping factor so that it is no longer possible to have sufficient damping for the moving body 11, thereby resulting in hunting. However, when the other end of the through hole 8a of the rod 8 opens into the small closed space 23 so that the fluid chamber 20 and the through hole 8a communicate with each other via the small hole 8b, then the closed space 23 has a small volume and so there is a small reduction in the volume due to the compression of the hydraulic fluid and it is possible to have a sufficient damping factor for the moving body 11 and therefore effectively prevent hunting.

Figure 3A:
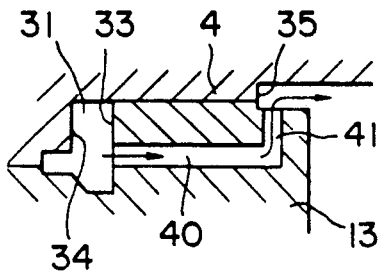
FIG. 3 is a partial, enlarged sectional view of a portion in the vicinity of the damping chamber of another embodiment of a relief according to the present invention, FIGS. 3(A) and 3(B) illustrating states corresponding to those illustrated in FIGS. 2(A) and 2(B), respectively.
Figure 3B:
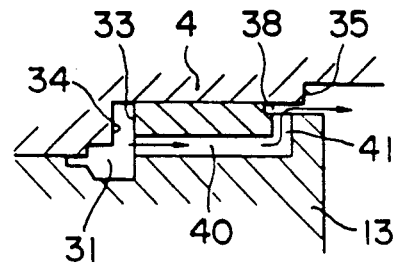
Figure 4:
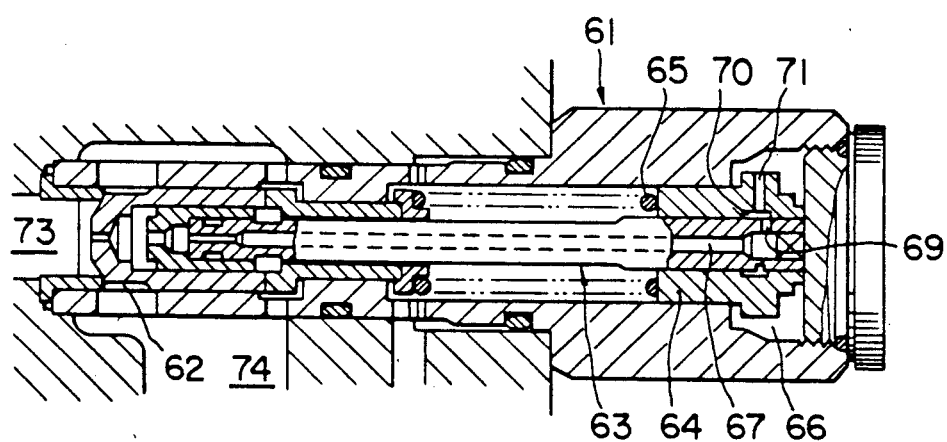
FIG. 4 is a sectional view of a conventional relief valve.

FIG. 3 shows another embodiment according to the present invention. In this embodiment, the moving spring receiving member 13 is provided with an axially extending hole 40 and a radially extending hole 41. When the movement of the moving spring receiving member 13 proceeds to a certain degree, the restricted passage 38 is formed as shown in FIG. 3(B). By this action, the amount of the hydraulic fluid flowing into the fluid chamber 20 from the ring-shaped damping chamber 31 is reduced.

As has been described above, according to the present invention, the fluid chamber is provided with an adjustment spring that urges the moving body in the axial direction, and a changing means to change the urging force of this adjustment spring is provided so that it can be operated from outside of the valve main body whereby it is not necessary to disassemble the relief valve as has been conventionally required. And, the adjustment of the set pressure can be achieved by only manipulating the changing means from outside of the valve body to therefore enable a quick and simple adjustment. In addition, in the conventional case where the urging force of the main spring was directly changed through the insertion of fillers, the set pressure changed greatly according to the number of fillers that were used and so it was not possible to effect a precise adjustment. However, in the present invention, an adjustment spring is separately provided from the main spring and the urging force of this adjustment spring can be directly changed by this changing means so that it is possible to continuously change the urging force of this adjustment spring and therefore allow fine adjustment.

What is claimed is:

1. A relieve valve comprising:
   a valve main body defining a communicating passage therethrough extending between a supply side and a relief side of the valve;
   a moving body disposed within said valve main body so as to be axially movable therein over a predetermined distance between respective positions at which the moving body opens and closes said communicating passage;
   a spring receiving member disposed between an outer periphery of said moving body and an inner periphery of said main body of the relief valve so as to be axially movable over a predetermined distance with said main body;
   a main spring disposed between one end portion of said spring receiving member and one end of said moving body, said main spring urging said moving body toward one end of the relief valve and urging said spring receiving member toward the other end of the relief valve;
   a fluid chamber defined at the other end portion of said moving spring receiving member;
   said moving body defining a hole therethrough open to the supply side of the valve and to said fluid chamber such that a portion of hydraulic fluid acting on one end of said moving body at the supply side of the valve is flowable into said fluid chamber through said hole; and
   an adjustment spring provided in said fluid chamber and urging said moving body in the axial direction of said main body for establishing the set pressure by compressing said main spring via said moving spring receiving member under the influence of hydraulic pressure generated in said fluid chamber, and adjustment means operable from the exterior of said main body of the relief valve for adjusting the urging force exerted by said adjustment spring.

2. The relieve valve according to claim 1, wherein:
   said main body has a stepped portion in an inner periphery thereof, said spring receiving member has a stepped portion on an outer periphery thereof, said stepped portions contacting and movable relative to one another and defining therebetween a ring-shaped damping chamber and a restricted passage, a spring chamber is defined within said valve main body, a main spring is housed within said spring chamber, and wherein said damping chamber is comminicable with said spring chamber via said restricted passage.

3. The relief valve according to claim 1, wherein:
   said main body has a stepped portion in an inner periphery thereof, and said moving spring receiving member has a stepped portion on an outer periphery thereof, said stepped portions contacting and movable relative to one another and defining therebetween a ring-shaped damping chamber and a restricted passage, said damping chamber communicable with said fluid chamber via said restricted passage.

4. The relief valve according to claim 1, wherein:
   a bush is mounted in said valve main body at the other end of said moving body, said bush and said moving body defining a space therebetween, the hole defined through said moving body being open to said space and extending radially of the moving body to said fluid chamber.

* * * * *